April 21, 1942.  O. F. MASTRIFORTE  2,280,156
WORK CLAMPING DEVICE FOR MACHINE TOOLS
Filed Oct. 23, 1940
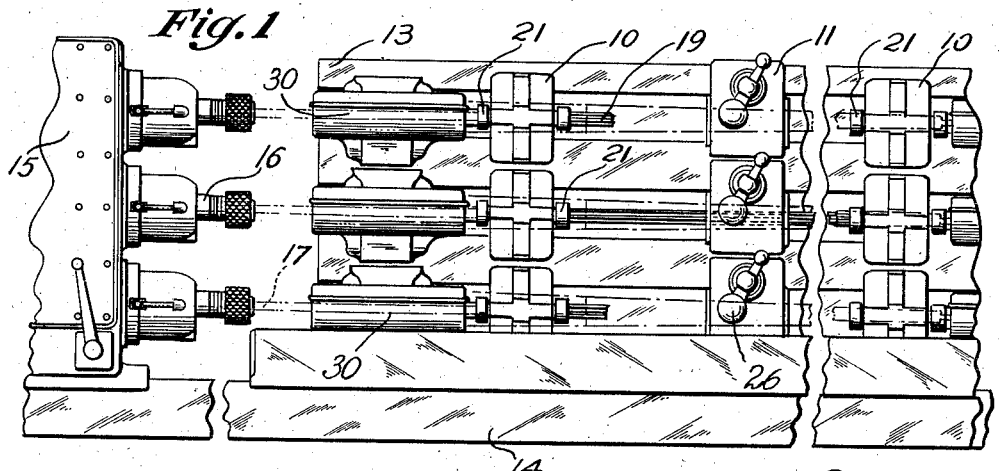
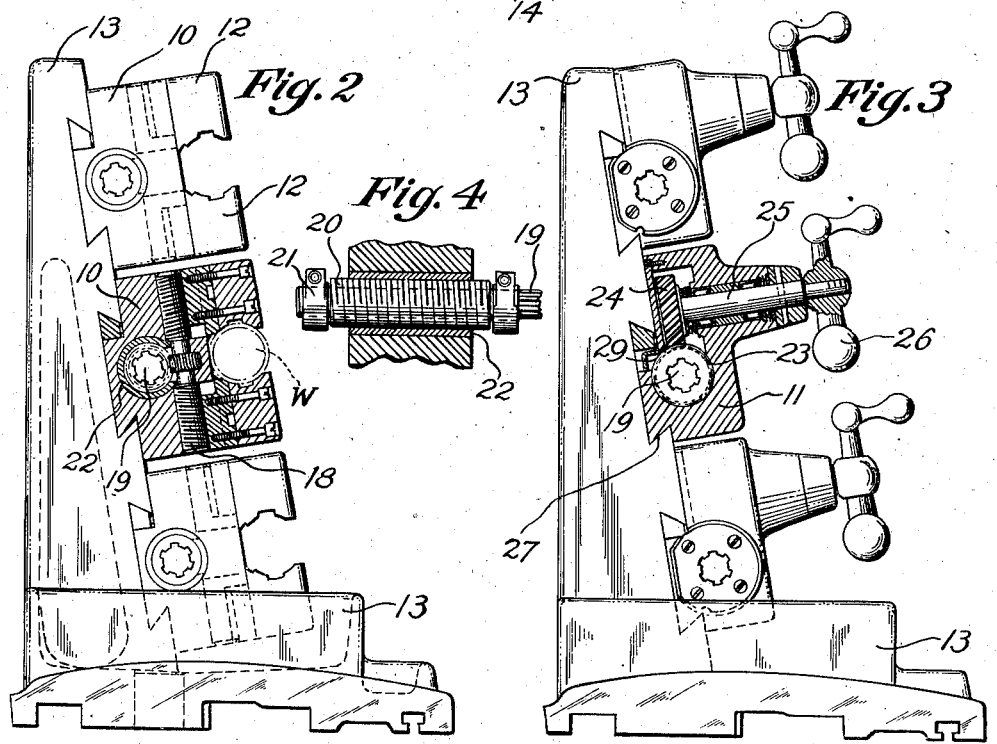
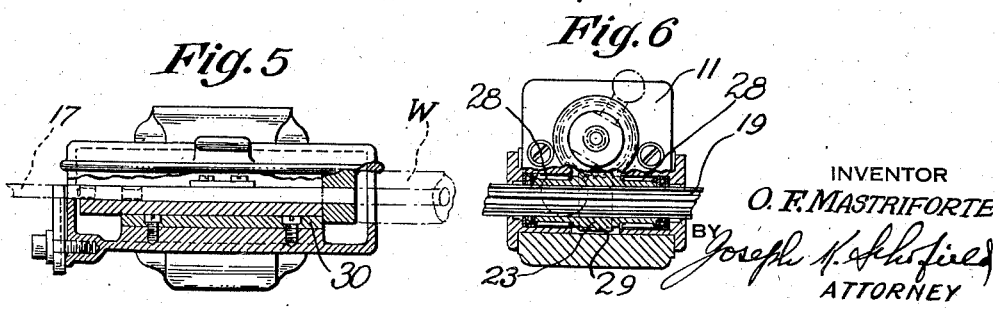
INVENTOR
O. F. MASTRIFORTE
BY
Joseph N. Schofield
ATTORNEY Patented Apr. 21, 1942

2,280,156

UNITED STATES PATENT OFFICE 2,280,156

WORK CLAMPING DEVICE FOR MACHINE TOOLS

Otil F. Mastriforte, West Hartford, Conn., assignor to Niles-Bement-Pond Company, West Hartford, Conn., a corporation of New Jersey Application October 23, 1940, Serial No. 362,430

4 Claims. (Cl. 77—63)

This invention relates to metal cutting machines and particularly to a machine in which a work piece being operated on is supported slidably in position upon a fixed axis and against rotation; and the tool, usually in the form of a drill, reamer or other internal cutting tool, is passed from end to end of the work piece while being rapidly rotated.

More particularly the present invention relates to means for clamping a work piece upon a fixed axis and against rotation for a cutting operation thereon, there being work clamping devices at each end of the work piece adapted to be opened and closed manually by a single mechanism which will cause the clamping devices to firmly grasp the work piece regardless of the particular diameter engaged by either clamping device.

A primary object of the present invention is to provide a convenient, efficient, and rapid work supporting means particularly for elongated work such as gun barrels, there being manual means to simultaneously open and close the work clamping members which engage the extreme ends of the work piece.

One feature which enables me to accomplish the above object is that the manually operated means may simultaneously rotate the work clamping devices at opposite ends of the work piece, and, when one of the clamping members engages the work piece, the other clamping device may continue to close upon its end of the work and finally both clamping members will simultaneously rigidly clamp the work upon the axis of the clamping devices and against rotation.

The particular embodiment of the invention described and illustrated in the present application is for reaming gun barrels, there being three complete units disposed obliquely one above the other and upon the same base of the machine shown in the drawing. As each unit is complete in itself, but one of them is thought to require specific description.

With the above and other objects in view, the invention includes the features of construction and operation set forth in the following specification and illustrated in the accompanying drawing.

In the accompanying drawing annexed hereto and forming a part of this specification, I have shown the invention embodied in a reaming machine for the gun barrel of a shoulder musket, but it will be understood that the invention can be otherwise embodied and that the drawing is not to be construed as defining or limiting the scope of the invention, the claims appended to this specification being relied upon for that purpose.

In the drawing:

Figure 1 is a front elevation of a portion of a machine having the present form of work clamping means, sections of the base being broken away.

Fig. 2 is an end elevation of some of the parts shown in Fig. 1, one of the work clamping members being shown in section.

Fig. 3 is an end elevation of other parts shown in Fig. 1, one of the clamp actuating members being shown in section.

Fig. 4 is a detail sectional view showing the mounting for one of the work clamp operating worms.

Fig. 5 is a front elevation, partly in section, showing the support and guide for the cutting tool, and Fig. 6 is a front elevation, partly in section, of the manually rotatable member to simultaneously open and close the work clamping members.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: first, work clamping devices, there being two, each mounted for engagement of the work piece at or adjacent an end of the work piece; second, oppositely movable jaws in each of the clamping members simultaneously movable to engage and disengage the work piece by means of a rotatable member having right and left hand screws within the body member of each work clamp; third, elongated worms mounted in each of the work clamping members and engaging the rotatable member for opening and closing the clamping jaws, the worm being mounted for limited slidable movement in addition to its rotation; fourth, a rotatable splined shaft connecting the worms for simultaneous rotation; and fifth, manual means to rotate the splined shaft to rotate or slidably move the two worms.

Referring more in detail to the figures of the drawing, to illustrate one embodiment of the invention I provide work clamping mechanism for a gun barrel reamer in which the gun barrel being operated on is supported slidably upon a fixed axis and retained against rotation by suitable clamping members or chucks. As shown in Figs. 1 and 2, the clamping devices 10 are disposed for engagement of the work piece W adjacent its opposite ends and between these two clamping members 10 is a manually operating means 11 for opening and closing the jaws 12 engaging the work piece W. In machines of the above type, it is essential that each clamping member 10 firmly engage the work piece W regardless of differences in diameter at its opposite ends. It is also desirable to have a single rapidly and conveniently operated means for simultaneously clamping the jaws 12 of the two members 10 upon the opposite ends of the work W so that work pieces may be quickly removed and others inserted in their place.

The machine illustrated in the drawing has three work supporting units and three tool operating units. Each of these is similar to the others and for that reason but one will require description. As shown in Figs. 1, 2 and 3, the three units are supported one above the other upon suitable brackets 13 on a carriage slidable upon the bed 14 of a suitable machine tool.

At the left of the machine as seen in Fig. 1 is a headstock 15 having three tool spindles 16 extending therefrom in which may be mounted suitable rotatable cutting tools 17. Means are also provided to individually mount these three cutting tools 17 rotatably in their headstock 15 and axially of the work pieces W being operated on. Slidable movement of the carriage and bracket 13 with the work pieces W engages the cutters with the entire length of the work pieces. As these cutting tools 17 form no part of the present invention, it is not thought necessary that their construction or operation be described.

Referring particularly to Figs. 1, 2 and 3, it will be seen that there are work clamping members 10, more clearly shown in Fig. 2, keyed or otherwise secured in position upon the supporting bracket 13. In the body portion of these work clamping members or chucks 10 are mounted opposed jaws 12 movable radially to engage or disengage the work piece W. Also in the body portion 10 is a right and left hand threaded member 18 having a central gear thereon by means of which the jaws 12 may be simultaneously moved to clamping or unclamping position. It will be understood that the clamping members 10 at the opposite ends of the work are duplicates of each other. It is the particular purpose of the invention to permit simultaneous clamping action of the two work clamps or chucks 10 regardless of differences in diameter of the opposite ends of the work piece W upon which they engage. For this purpose each clamp or chuck 10 must operate independently of the other clamping member and the actuating member must permit both clamping members to move into their clamping positions regardless of any differences in diameter at the opposite ends of the work piece.

In order to effect simultaneous clamping action of the work clamping jaws 12 there is disposed between the two clamping members an elongated splined shaft 19. Its opposite ends are provided with worms 20 as shown more particularly in Fig. 4, retained against sliding movement upon the splined shaft 18 by means of clamping collars 21 at opposite ends. It will be seen from an inspection of Fig. 4 that the worm 20 is substantially longer than the bushing 22 within which it is mounted so that it may slide axially with the splined shaft a limited distance until one of the clamping collars 21 engages against the end face of the bushing 22.

In order to rotate this splined shaft 19 to force rotation of the two worms 20 and axial sliding movement of the worms and splined shaft to compensate for differences in diameter of the work W engaged by the two clamping members 10, a unitary operating mechanism 11 is provided. This operating device 11 is more clearly shown in Figs. 3 and 6, in which it will be seen that the splined shaft 19 passes centrally through a rotatable member 23 supported preferably upon anti-friction bearings 28 within a portion of its body member 11 and having gear teeth 29 at its central portion. Engaging the gear teeth 29 of this member 23 is a gear 24 upon the rear end of a forwardly extending shaft 25, there being a handle 26 upon the outer or free end of this shaft. The actuating members 11 are, as shown in Figs. 1 and 3, mounted in the central portion of bracket 13 secured to the base 14. A separate actuating means 11 is provided for each unit so that rotation of a handle 26 opens or closes one pair of chucks 10 engaging the opposite ends of a work piece W.

In operation and with the clamping members 10 of a unit open, a work piece W is inserted in position and the handle 26 of the operating member rotated for that unit. This rotates the splined shaft 19 through the gear connections described above and thus rotates the worms 20 engaging with the jaw closing members 18. Rotation of these members 18 will continue until one or the other firmly clamps its end of the work piece W. Continued rotation of the splined shaft 19 will then cause sliding movement of the worm 20 instead of rotation of the large closing members and this will continue until the clamp at the opposite end of the work piece firmly engages its end, whereupon both clamps will firmly and equally engage the work piece regardless of which member is clamping upon a larger or smaller diameter. But one of the worms 20 is shown which is of right hand helix. It will be understood, however, that the worm 20 for the work clamp at the opposite end of the work piece W must be of the opposite or left hand helix.

To guide the tool 17 as it enters the work piece W a housing 30 may be provided as shown in Fig. 5. This member, however, forms no part of the present invention.

What I claim is:

1. Work holding means for machine tools comprising in combination, a pair of axially spaced chucks positioned to engage spaced portions of an elongated work piece having different diameters at its chuck engaging points, jaws movable within said chucks, a member within each chuck engaging the jaws thereof, each of said members having a gear formed centrally thereof, worms engaging said gears and mounted for limited independent axial movement, and unitary manual means to simultaneously rotate said worms.

2. Work holding means for machine tools comprising in combination, a pair of axially spaced chucks positioned to engage spaced portions of an elongated work piece having different diameters at its chuck engaging points, jaws movable radially within said chucks, a right- and left-hand screw threaded member within each chuck engaging the jaws thereof, each of said members having a gear formed centrally thereof, worms engaging said gears and mounted for limited independent axial movement, and unitary manual means slidably engaging said worms to simultaneously rotate said worms.

3. Work holding means for machine tools comprising in combination, a pair of axially spaced chucks positioned to engage spaced portions of an elongated work piece having different diameters at its chuck engaging points, jaws movable radially within said chucks, a member within each chuck engaging the jaws thereof rotation of which simultaneously operates said jaws, said members having a gear formed centrally thereof, worms engaging said gears and mounted for limited independent axial movement, and unitary manual means to simultaneously rotate said worms.

4. Work holding means for machine tools comprising in combination, a pair of axially spaced chucks positioned to engage spaced portions of an elongated work piece having different diameters at its chuck engaging points, jaws movable radially within said chucks, a member within each chuck engaging the jaws thereof, said members having a gear formed centrally thereof, worms engaging said gears and mounted for limited independent axial movement, and unitary manual means to simultaneously rotate said worms, said rotating means having adjustably mounted collars thereon to retain said worms in axial position.

OTIL F. MASTRIFORTE.